(12) United States Patent
Carrea

(10) Patent No.: US 7,127,897 B2
(45) Date of Patent: Oct. 31, 2006

(54) COMBUSTION CHAMBER

(75) Inventor: Elisabetta Carrea, Zurich (CH)

(73) Assignee: ALSTOM Technology Ltd., Baden (CH)

( * ) Notice: Subject to any disclaimer, the term of this patent is extended or adjusted under 35 U.S.C. 154(b) by 315 days.

(21) Appl. No.: 10/768,134

(22) Filed: Feb. 2, 2004

(65) Prior Publication Data

US 2004/0154307 A1    Aug. 12, 2004

(30) Foreign Application Priority Data

Jan. 31, 2003    (GB) .................. 0302301.7

(51) Int. Cl.
*F02C 3/00*    (2006.01)
*F23R 3/52*    (2006.01)

(52) U.S. Cl. .......................... 60/722; 60/804

(58) Field of Classification Search .............. 60/722, 60/752, 755, 804
See application file for complete search history.

(56) References Cited

U.S. PATENT DOCUMENTS

| | | | | |
|---|---|---|---|---|
| 2,855,754 A | * | 10/1958 | Gianotti | ........................ 60/804 |
| 3,309,866 A | * | 3/1967 | Kydd | ............................ 60/804 |
| 4,297,093 A | * | 10/1981 | Morimoto et al. | ............. 431/10 |
| 4,563,875 A | | 1/1986 | Howald | ..................... 60/39.23 |
| 5,195,315 A | | 3/1993 | Holladay | |
| 6,192,669 B1 | * | 2/2001 | Keller et al. | .................. 60/804 |
| 6,336,806 B1 | | 1/2002 | Paschereit et al. | |
| 6,460,341 B1 | | 10/2002 | Gutmark et al. | |
| 2001/0027638 A1 | | 10/2001 | Paschereit et al. | |
| 2002/0069648 A1 | | 6/2002 | Levy et al. | .................... 60/804 |

FOREIGN PATENT DOCUMENTS

| | | |
|---|---|---|
| CH | 679799 | 4/1992 |
| DE | 44 12 315 | 10/1995 |
| EP | 0 870 990 | 10/1998 |
| FR | 1.002.314 | 9/1946 |
| WO | WO01/11215 | 2/2001 |

OTHER PUBLICATIONS

GB Search Report (issued Jun. 26, 2003).
Search Report for German Patent Appl. No. 10 2004 003 816.3 (Jul. 29, 2005).

* cited by examiner

*Primary Examiner*—Louis J. Casaregola
(74) *Attorney, Agent, or Firm*—Cermak & Kenealy, LLP; Adam J. Cermak

(57) ABSTRACT

A combustion chamber 10 for a gas turbine operates in a highly diluted mode of combustion has a substantially toroidal plenum 30. At least one combustion fluid injector is located at the periphery of the plenum. The shape of the plenum and the disposition of the combustion fuel injectors are such that a vortex flow 2 is established in the combustion chamber in use. Gasses are entrained in the vortex which provides high enough levels of the gas re-circulation to allow for the onset of highly diluted combustion.

11 Claims, 9 Drawing Sheets

COMBUSTION CHAMBER

The invention relates to a combustion chamber for a gas turbine and a method of operating a combustion chamber for a gas turbine.

Gas turbines operate on the basis of fossil fuel combustion. Fossil fuel combustion processes are these days governed by two major requirements which are in contrast with one another. On the one hand, a combustion process should achieve the highest possible efficiency (so as to save fuel and reduce $CO_2$ emissions); on the other hand, the process should minimise pollutant omissions (for example NOx).

One of the most common ways to improve the efficiency of a combustion process is to use high temperature combustion air preheating. This approach causes combustion to take place at relatively high flame temperatures and eventually the energy of the high temperature combustion gases is transferred to the combustion air using a recuperative or regenerative heat exchanger. One drawback of high preheated air temperatures is that the flame experiences increased peak temperatures, with a disastrous effect upon the thermal-NOx formation path.

Research has been carried out on the combustion of hydrocarbons using diluted reacting mixtures that are kept at a temperature above the self-ignition threshold via the re-circulation of flue gas. The use of the flue gas dilutes the reacting mixture and can be used to provide the energy to allow for self-ignition.

Flue gas re-circulation increases the contents of inerts in a mixture. Early research into the flammability limits for combustion of hydrocarbons and air [Zabetakis, 1965] showed that it is possible to obtain flammable mixtures for re-circulation rates of up to 50%. More recent research aimed at providing reliable operating conditions for practical systems has shown that re-circulation rates of up to 30% can be used as a NOx-reducing technique [Wilkes and Gerhold, 1980]. The flue gas recirculation rate R is defined as the ratio of the flow rate of the re-circulated flue gas and the flow rate of the fresh mixture fed into the combustion chamber:

$$R = \frac{G_{IR} + G_{ER}}{F + Ox}$$

where:
$G_{IR}$=Flue gas re-circulated inside the combustion chamber;
$G_{ER}$=Flue gas re-circulated outside the combustion chamber;
F=Fuel; and
Ox=fresh oxidant (usually air).

It has however recently been found that it is possible to stabilise a flame at a much higher flue gas re-circulation rate than previously thought. This can produce a mode of combustion that produces a non-visible, non-audible flame. Such a flame is associated with even temperature and concentration profiles, and no hot spots.

This alternate combustion mode, termed for the purposes of this document as "highly diluted combustion", arises as a result of the very high level of dilution of the reacting mixture. The high level of dilution prevents the formation of localised temperature peaks and thus lowers NOx formation. To achieve an operating set-up that exploits the self-ignition of the flammable diluted mixture, it is necessary to provide a mixture temperature that is above the autoignition threshold. Such a condition will result in a very low temperature difference between the initial and adiabatic flame temperatures, as compared to conventional non-diluted visible flames.

$$T_{ad} = T_{in} - \frac{\Delta H_R}{c_p} \cdot Y_{Fuel} = -\frac{\Delta H_R}{c_p} \cdot \frac{1}{R+1} \cdot \frac{F}{F+Ox}$$

$$\Delta T = T_{ad} - T_{in} \propto \frac{1}{R+1}$$

where:
$T_{ad}$=adiabatic temperature (K);
$T_{in}$=initial temperature of the reacting mixture (K);
$\Delta H_R$=heat of the reaction (kJ/kg);
$c_p$=specific heat of reacting mixture;
$Y_{Fuel}$=molar fraction of burned fuel;
R=re-circulation rate;
F=fuel molar rate; and
Ox=oxidant molar rate.

The above two equations indicate that the difference between the adiabatic temperature ($T_{ad}$) and the initial temperature ($T_{in}$) of the mixture decreases as R increases. The re-circulation rate R acts on the value of the initial temperature ($T_{in}$), as this is the result of an energy balance between the re-circulated flue gas and the fresh oxidant stream fed into the combustion chamber. However, the value of R does not affect the value of the adiabatic temperature ($T_{ad}$), as shown from further elaboration of the above equations in conjunction with standard equations of adiabatic combustion:

$$T_{ad} = T_{oxi} - \frac{\Delta H}{c_p} \cdot \varphi(\phi)$$

where:

$$\varphi(\phi) = \phi \cdot \left(\frac{Y_{Fuel}}{Y_{oxi}}\right)_{stoich} + 1$$

$T_{oxi}$=oxidant inlet temperature;
$\phi$=equivalence ratio; and
$Y_{oxi}$=oxidant mole fraction.

The equivalence ratio parameter ($\phi$) is frequently encountered in the standard literature of combustion, and is simply defined as:

$$\Phi = \frac{1}{\lambda}$$

The relative air to fuel ratio, $\lambda$, is defined as:

$$\lambda = \frac{(\% \text{ fuel}/\% \text{ air})_{stoichiometric}}{(\% \text{ fuel}/\% \text{ air})_{actual}}$$

where:
% fuel and % air are the molar percentage (or molar fraction) of fuel and air respectively derived by:

$$\% \text{ fuel} = \frac{F_{Fuel}}{F_{Air} + F_{Fuel}}$$

-continued $$\% \text{ air} = \frac{F_{Air}}{F_{Air} + F_{Fuel}}$$

and where:

$F_{Air}$ and $F_{Fuel}$ are the molar flow rates of air and fuel respectively.

Excess air is defined as: $e(\%)=(\lambda-1)*100$.

Combustion is usually characterised by the stoichiometry of the reacting mixture.

$\lambda<1$ ($\phi>1$): fuel rich mixtures—rich stoichiometry
$\lambda=\phi=1$: stoichiometric conditions
$\lambda>1$ ($\phi<1$): fuel lean conditions—lean stoichiometry Conventional gas turbine systems typically operate under lean premixed combustion conditions and employ combustion chambers of the annular, can, can-annular or silos type. Such combustion systems typically rely on a swirl-stabilized flame, in which a small re-circulation zone is formed at the exit of the burners via aerodynamic means. This allows ignition and burnout in a very compact combustor zones, which results in very short residence times (of the order of a few milliseconds) and therefore permits the use of very compact combustion chambers.

Such a system is typically operated with a very lean flame ($\lambda\geq2$) at around 20 bar, with the oxidant (usually air) preheated to 720 K by compression, and with a flame temperature of around 1750 K. Typical systems have ignition delay times of the order 3 to 5 ms, with residence times of the order of 20–30 ms. Targeted emission levels are: UHC and CO below 10 ppm, and single digit NOx ppm (normalised at 15% $O_2$). These example conditions refer to a gas turbine operating in a full engine load operation mode, and it is necessary to respect the above constraints.

However, such systems are associated with a number of drawbacks. One problem is the generation of self-induced pressure pulsations, which can have dramatic consequences on the mechanical integrity of the combustion system. This problem arises from the small re-circulation zones formed at the exit of each burner. These are not stable and can lead to pressure fluctuations with the combustion chamber termed pulsations.

This tendency for the pressure to fluctuate means that it is necessary to run such systems within constrained operating conditions. Another problem still is the high risk of flashback into the burner, which is an intrinsic characteristic of lean premix systems.

As an alternative to operating with conventional lean premix swirl-stabilized flames, gas turbines could be run in a highly diluted mode, relying on the non-stabilized auto-ignition concept. In highly diluted combustion, a flame ignites spontaneously when enough energy has been released and transferred to the reactants. Thermal energy is then transferred to the reactants as they mix with the re-circulated flue gas. The amount of hot flue gas that needs to be mixed with reactants in order to establish auto-ignition and burnout depends on the rating of the combustion process, and depends on the load for gas turbine systems. The higher the rating (and therefore the process temperatures), the lower the amount of gas dilution needed for auto-ignition and vice versa.

Implementing a highly diluted combustion mode in a gas turbine would allow the flame temperature to be maintained at the desired operating value with a much lower difference between the adiabatic and initial temperatures ($\Delta T$). This would help solve the problem of suppressing high temperature spots, and could bring benefits in terms of emissions levels and combustion efficiency by providing a uniform temperature field.

In order to implement highly diluted combustion is a gas turbine, the system has to operate within the temperature and pressure ranges associated with gas turbines, as well as their characteristic timescales. Gas turbine systems are typically run with the combustion oxidant preheated to 400–500° C. by the compression process. Therefore, no separate recuperators or regenerators are necessary.

However, heat exchangers or alternative heat sources can still be used to further heat the combustion oxidant. As a result of their very lean stoichiometry, gas turbine systems could employ highly diluted combustion with partially premixed or fully premixed flames. Tests performed at atmospheric pressure under operating conditions typical of gas turbine systems have shown that a flue gas re-circulation rate higher than 100% is enough to establish highly diluted combustion, due to the very lean stoichiometry of the system ($\lambda\geq2$).

In conventionally shaped gas turbine combustion chambers, highly diluted combustion can be established by means of high velocity jets, whose momentum will entrain re-circulated flue gas according to the free jet momentum law.

Chemical kinetics calculations carried out under operating conditions typical of a gas turbine combustion systems have revealed information on a number of gas turbine parameters when operating under highly diluted combustion. It has been found that high flue gas re-circulation rates cause auto-ignition delay times rates that are within the ranges typically required by gas turbine systems (see FIG. 1).

The calculations also have shown that burnout times are not affected by the dilution degree of the mixture. This is because adiabatic or quasi-adiabatic flue gas re-circulation allows for a high enough flame temperature (see FIG. 2).

A beneficial effect of flue gas re-circulation on the NOx formation path has been found. This effect is more pronounced at high pressure, where combustion carried out with a strong flue gas re-circulation rate shows better low-NOx potential than conventional lean premix combustion (see FIG. 3).

It has been further found that flue gas re-circulation rate increases as the load decreases, thus allowing hot gas entrainment at lower operating load and allowing for auto-ignition at lower engine operating regimes (see FIG. 4). FIG. 4 shows the flue gas re-circulation rate calculated via the jet momentum conservation law, whereby:

$$\frac{\dot{M}}{\dot{M}_0} = \frac{u_0}{u} = \sqrt{\frac{\rho}{\rho_0} \cdot \frac{A}{A_0}}$$

For circular jets:

for: $x/d_0 < 8$ $$K_V(\%) = \left[0.083*\frac{x}{d_0} + 0.0128*\left(\frac{x}{d_0}\right)^2\right] \cdot \frac{\rho}{\rho_0}$$

for: $x/d_0 > 8$ $$K_V(\%) = 0.32*\frac{x}{d_0}*\sqrt{\frac{\rho}{\rho_0}}$$

Where:
    M=total mass flow rate;
    $M_0$=mass flow rate at nozzle exit;
    u=mean axial velocity component;
    $u_0$=mean axial velocity component at nozzle exit;
    ρ=gas density;
    $ρ_0$=gas density at nozzle exit;
    A=jet cross area;
    $A_0$=nozzle area;
    x=axial distance from nozzle exit; and
    $d_0$=nozzle diameter.

If the flow has a swirling component then the rate of entrainment and the rate of velocity decay are increased. The enhanced entrainment capability of a swirling jet has been defined as:

$$K_V = \left(0.32 \cdot \frac{x}{d_0} + K \cdot S\right) \cdot \sqrt{\frac{\rho}{\rho_0}}$$

where:
    S=the swirl number;
    K=is an empirical constant.

In a conventional gas turbine combustion process, characterized by a swirl stabilised lean premix combustion mode, the overall process time can be defined as:

$$\tau_{tot} = \tau_{tr} + \tau_{ig} + \tau_{BO}$$

where:
    $\tau_{tr}$=the transport time, which in this case is the time necessary to convey the mixture to the stabilization zone;
    $\tau_{ig}$=the ignition delay time;
    $\tau_{BO}$=the burnout time.

In a highly diluted combustion mode, the characteristic timescales can be defined as:

$$\tau_{tot} = \tau_{tr} + \tau_{mix} + \tau_{ig} + \tau_{BO}$$

where:
    $\tau_{tr}$=the transport time, which in this case is the time necessary to entrain the hot flue gas;
    $\tau_{mix}$=the mixing time necessary to mix the oxidant diluted with hot flue gas and the fuel.

In a conventional lean premix system the mixing time is not considered in the equation, as the mixture is considered already perfectly premixed at the exit of the burner. However, as highly diluted combustion is established in conventionally shaped combustion chambers using high velocity jets, such systems are characterized by a longer overall process times as the convective and mixing times are significant. The reactants are entrained ($\tau_{tr}$) and mixed with the hot gases ($\tau_{mix}$) as the jet develops. When enough hot gas is entrained and mixed to reach the auto-ignition threshold, ignition will occur ($\tau_{ig}$) and then eventually burnout ($\tau_{BO}$).

As a result, highly diluted combustion is associated with the drawback of a longer overall time for the process than for a conventional lean premix system. This results in the need for longer combustion chambers, which is undesirable in gas turbine systems as a result of the augmented mechanical stresses to the shaft.

Another drawback of using conventional gas turbine combustion chambers for highly diluted combustion concerns the mixing process. A very good degree of mixing between air, fuel and the hot gas is a primary requirement for process performance in terms of emissions and thermal failure control.

FIG. 5 is a schematic diagram of a conventionally shaped combustion chamber 200 being used in a highly diluted combustion mode. High velocity jets 250 inject compressed oxidant and fuel into the chamber and flue gas is re-circulated entirely inside the combustion chamber 200. In such an arrangement, the rate of flue gas re-circulation increases with jet velocity (or momentum). However, higher jet velocities are also associated with higher pressure drops. Aerodynamic studies have shown that for a typical gas turbine system the maximum re-circulation rate that can be achieved with simple high velocity jets while respecting the pressure drop constraints varies from 100% to 200%.

In a typical gas turbine system, the maximum pressure drop allowed for the burner module is 3% of the total operating pressure. The use of single free jets could provide re-circulation rates higher than 200%, whilst keeping the pressure drop of the burner/injector module below the 3% limit. However, gas turbines typically operate with very high air to fuel ratios (i.e. very lean mixtures) and severe space constraints, and thus cannot use a burner based on single free jets. The design of high velocity jet injectors is limited by the inherent space constraints associated with gas turbines and the pressure drop limit. In is therefore unavoidable that each jet will interfere with the adjacent jets and the nominal entrapment capability of each single jet will be depleted.

Alternatively, all or part of the flue gas can be re-circulated outside the combustion chamber 200. This can avoid the problem of longer characteristic times, as the re-circulated flue gas could be premixed with the reactants before they enter the combustion chamber. However, such a configuration can result in undesirably high pressure losses which result in a lower process efficiency. Moreover the temperature of the flue gas will be lower due to heat loss during re-circulation outside the combustion chamber. This narrows the operation flexibility of the system and further lengthens the ignition delay and the burnout times.

Therefore on the basis of the above it can be difficult to provide a high enough flue gas re-circulation rate to allow for the onset of highly diluted combustion in a conventionally shaped combustion chamber.

The object of the invention is to provide a combustion chamber for a gas turbine which obviates of ameliorates the above described problems associated with highly diluted combustion.

According to a first aspect of the invention there is provided a combustion chamber for a gas turbine, the said combustion chamber comprising: a substantially toroidal plenum extending around a rotor axis of the gas turbine, the said plenum comprising a substantially tangential outlet that extends around a radially inner peripheral region of the said plenum; wherein the said tangential outlet is adapted to direct gases towards the turbine in a direction that is substantially parallel to the rotor axis of the turbine; and at least one combustion fluid injector disposed in a peripheral region of the said plenum, the or each said combustion fluid injector being adapted to inject fluid into the said plenum to establish a vortex flow in a central region of the said plenum that extends around the said rotor axis of the gas turbine in a circular path; wherein the or each said combustion fluid injector is adapted to entrain sufficient gasses in the said vortex to establish a high enough flue gas re-circulation rate to enable the generation of a highly diluted combustion mode in the said plenum during combustion.

Such a combustion chamber is able to provide high levels of flue gas re-circulation inside the combustion chamber. The levels of re-circulated flue gas are sufficient to allow for the onset of highly diluted combustion. In addition, such combustion chambers employ a flame that is both compact and well distributed over the entirety of the volume of the combustion chamber and is not associated with a flame front. Highly diluted combustion in such chambers is achieved by means of the vortex rather than by the high velocity jets used in conventionally shaped combustion chambers. This enables the characteristic timescales concerning combustion to be shorter, which enables such combustion chambers to be more compact than conventionally shaped combustion chambers when used for highly diluted combustion.

In one embodiment an angle formed between a direction of fluid injection from the or each said combustion fluid injector and a tangential direction at a point where the fluid meets said vortex is from 0° to 90°. In another embodiment the said angle is from 15° to 60°.

The combustion chamber may comprise at least one oxidant injector and at least one fuel injector, the said combustion chamber being adapted to operate with separate oxidant and fuel injection. The fuel can be injected upstream of the oxidant injection. This can help avoid quenching and enable a large amount of control over the combustion.

The said injected fluid can comprise a premixed or partially premixed mixture of fuel and oxidant.

The or each combustion fluid injector may be characterised by a swirl coefficient of less than 0.6. In still another embodiment the or each combustion fluid injector is characterised by a swirl coefficient of less than 0.4. In another embodiment still the combustion chamber further comprises moving parts adapted to produce flow in the said combustion chamber with a swirl coefficient of greater than 0.6, and wherein the said combustion chamber is adapted to operate with a swirl coefficient of greater than 0.6 in a back-up mode.

The combustion chamber may further comprise a plurality of out of phase pulsating jets, the said out of phase pulsating jets being adapted to inject the air and fuel into the combustion chamber.

The substantially tangential outlet may be adapted to extend around an entire radially inner peripheral region of the said plenum to define a circular outlet. The substantially tangential outlet may comprise a nozzle. The combustion chamber may further comprise a guide device located either upstream or downstream of the substantially tangential outlet, where the said guide device is adapted to direct gasses into the blades of the turbine. The guide device may comprise a vane or a blade.

According to a second aspect of the invention there is provided a method of using a combustion chamber for a gas turbine, the method comprising: providing a substantially toroidal plenum extending around a rotor axis of the gas turbine, providing the said plenum with a substantially outlet extending around an inner peripheral region of the said plenum, and using the said tangential outlet to direct gases towards the turbine in a direction that is parallel to the rotor axis of the turbine; and using at least one combustion fluid injector disposed in a peripheral region of the said plenum to inject fluid into the said plenum to establish a vortex flow in a central region of the said plenum that extends around the said rotor axis of the gas turbine in a circular path, and using the or each said combustion fluid injector to entrain sufficient gasses in the said vortex to establish a high enough flue gas re-circulation rate to enable the generation of a highly diluted combustion mode in the said plenum during combustion.

In one such embodiment the method further comprises positioning the or each said combustion fluid injector such that an angle formed between a direction of fluid injection from the or each said combustion fluid injector and a tangential direction at a point where the fluid meets said vortex is from 0° to 90°. In another embodiment the method further comprises using an angle from 15° to 60°.

The method may further comprise using at least one oxidant injector and at least one fuel injector, and operating the said combustion chamber with separate oxidant and fuel injection. The method can comprise injecting the fuel upstream the oxidant injection.

The method can comprise using a premixed or partially premixed mixture of fuel and oxidant as the injected fluid.

The method may further comprise using the or each combustion fuel injector with a swirl coefficient of less than 0.6. In another embodiment the method further comprises using the or each burner with a swirl coefficient of less than 0.4. In still another embodiment the method further comprises using moving parts to produce flow in the said combustion chamber with a swirl coefficient of greater than 0.6, and operating the said combustion chamber with a swirl coefficient of greater than 0.6 in a back-up mode.

The method may further comprise using a plurality of out of phase pulsating jets to inject the air and fuel into the combustion chamber.

The method may further comprise using a substantially tangential outlet that extends around an entire radially inner peripheral region of the said plenum to define a circular outlet. The method may further comprise providing the substantially tangential outlet in the form of a nozzle. The method may further comprise using a guide device located either upstream or downstream of the substantially tangential outlet to direct gasses into the blades of the turbine. The method may further comprise providing the guide device in the form of a vane or a blade.

Embodiments of the invention will now be described, by way of example and with reference to the accompanying drawings in which.

A toroid is a solid generated by rotating a closed curve about an axis (termed the toroid axis) in its own plane. The curve does not intersect or contain the axis. In an annular toroid (commonly termed a torus) the closed curve forms a circle. For the purposes of this document, the following conventions will be used. A "circumferential direction" will refer to a direction based on a virtual circle that is coaxial with a torus. A "radial section" will refer to a section through a torus taken in the plane of the closed curve, and a "radial section circumference" is based on the perimeter of the radial section, i.e. the closed, circular curve. A "tangential direction" is defined by a tangent at a point on the closed curve.

Figure 1:
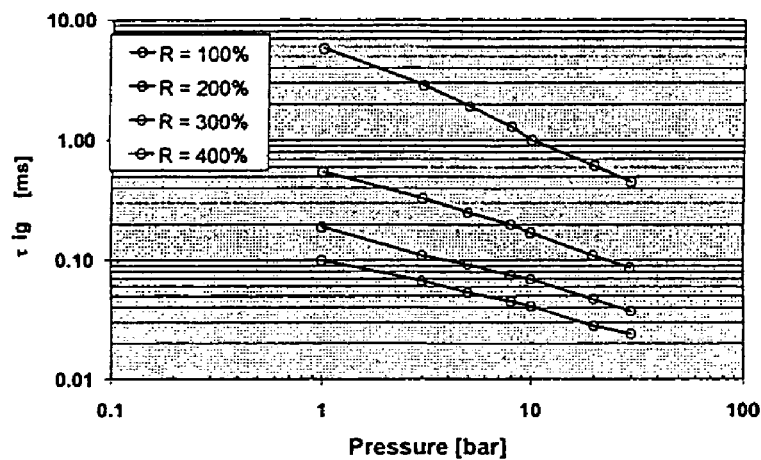
FIG. 1 is a graph of autoignition delay time against pressure for different flue gas re-circulation rates.
Figure 2:
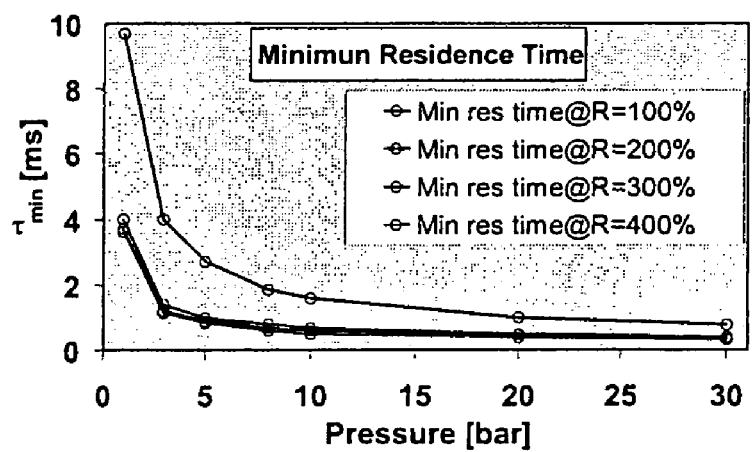
FIG. 2 is a graph of minimum burnout time against pressure for different flue gas re-circulation rates.
Figure 3:
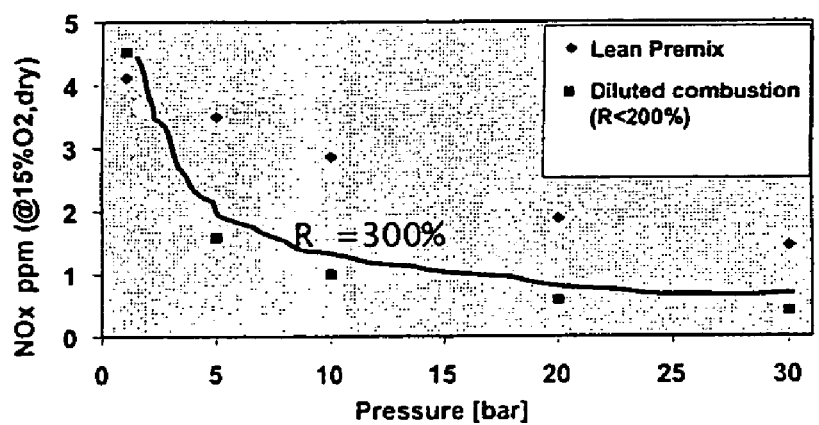
FIG. 3 is a graph of NOx emission against pressure that compares a lean premixed mode with a diluted combustion mode.
Figure 4:
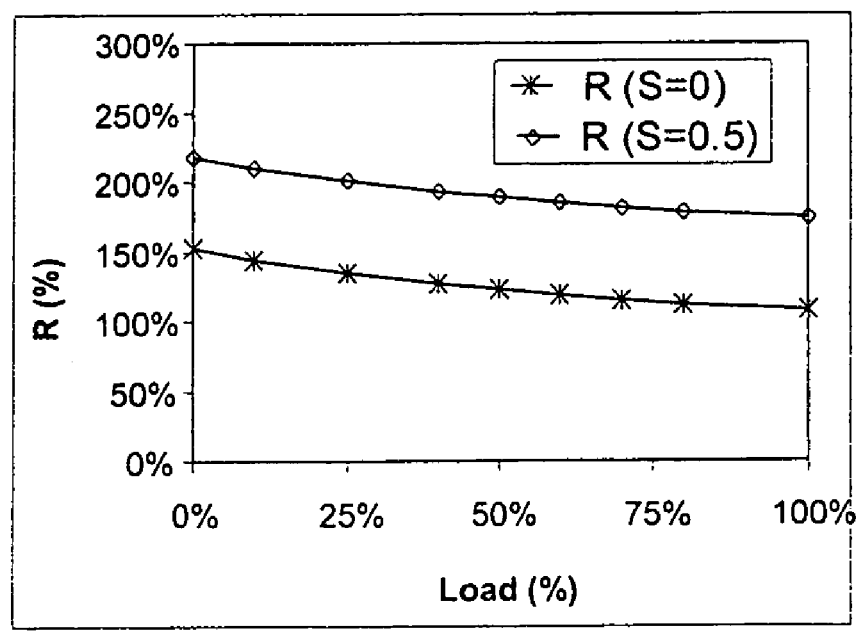
FIG. 4 is a graph of re-circulation rate against load.
Figure 5:
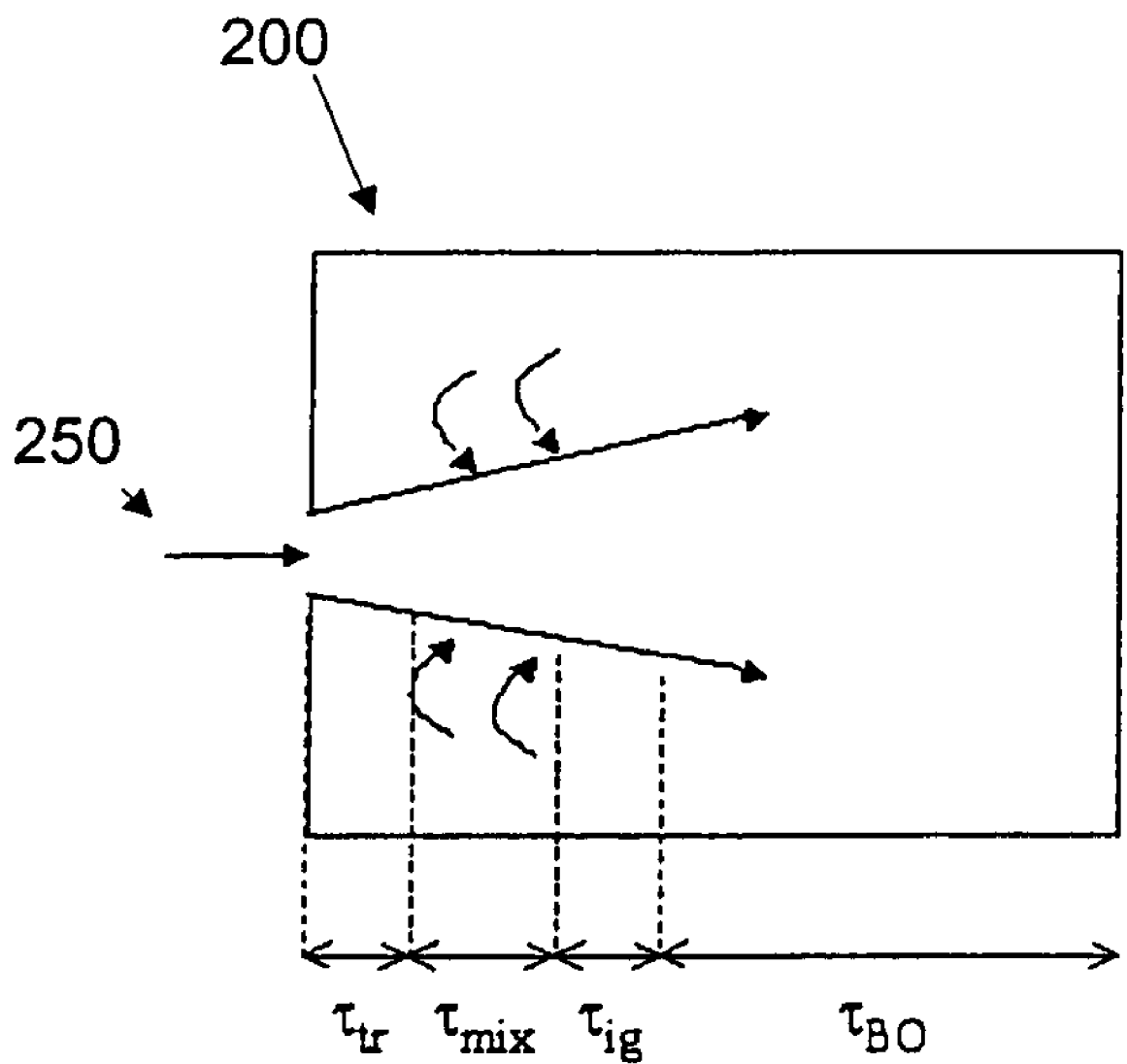
FIG. 5 is schematic diagram of a conventionally shaped combustion chamber adapted to be used in a highly diluted combustion mode.
Figure 6:
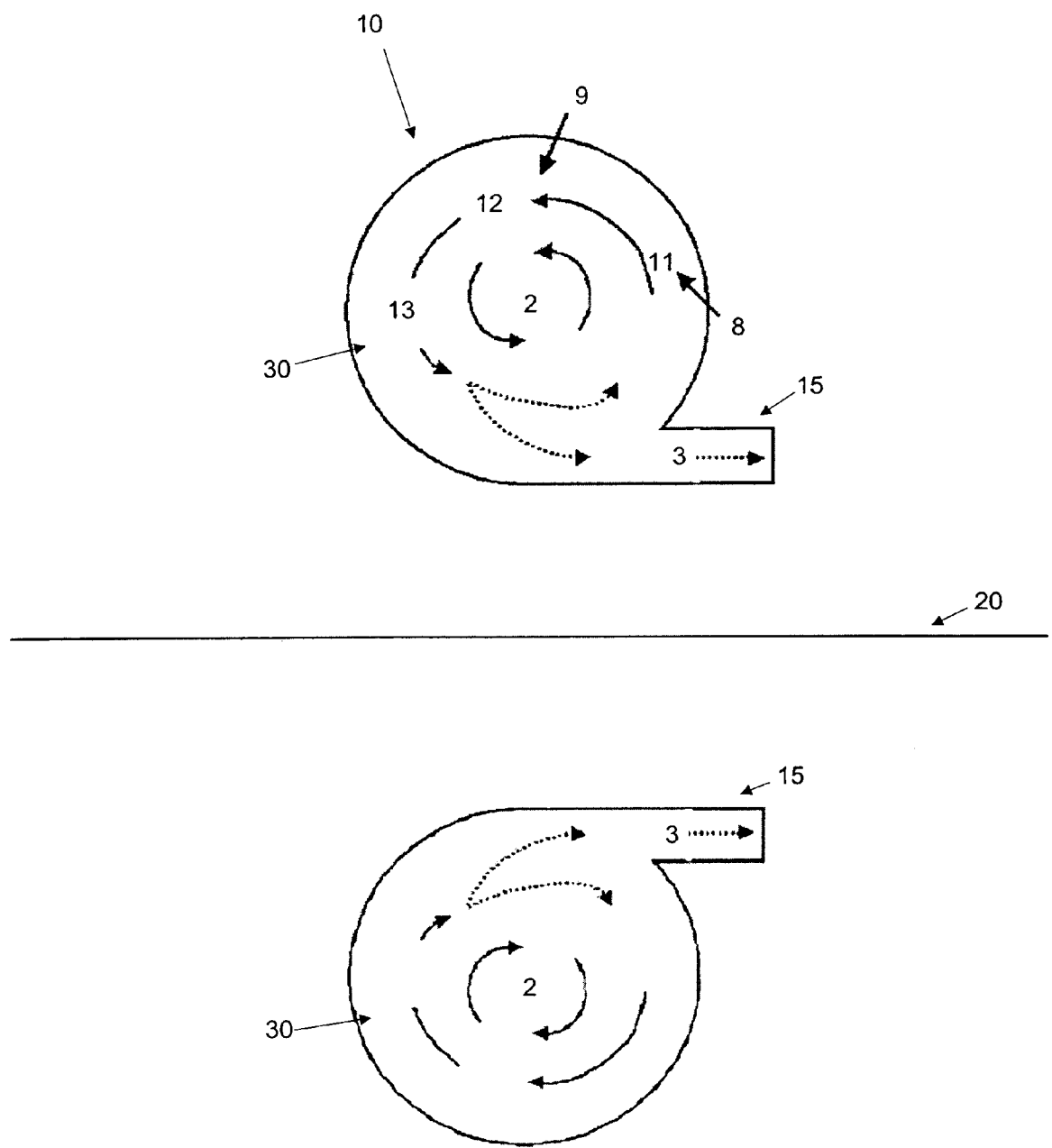
FIG. 6 is a schematic view of a radial section toroidal combustion chamber according to a first embodiment of the invention.
Figure 7:
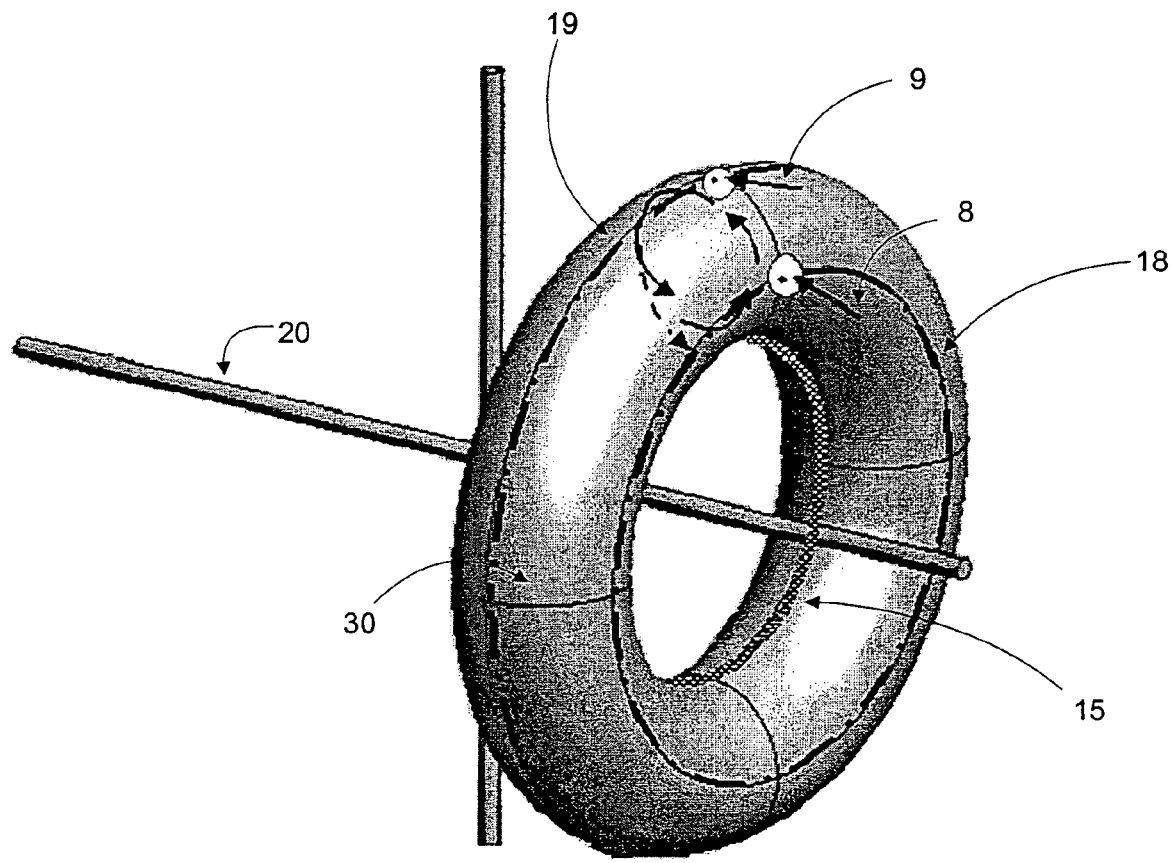
FIG. 7 is a schematic perspective view of the toroidal combustion chamber of FIG. 6.

The combustion chamber 10 according to a first embodiment shown in FIGS. 6 and 7 has an inner space 30 that has a substantially annular toroidal form that extends around the rotor axis 20 of the gas turbine, with a tangential outlet that extends around the radially inner periphery of the inner space 30 about the rotor axis. The tangential outlet forms the combustion chamber exit 15, and directs hot gases towards the turbine in a tangential direction that is parallel to the rotor axis 20 of the gas turbine. The outlet could be in the form of a nozzle or any suitable channel.

The inner space 30 forms a plenum, and the combustion chamber 10 comprises a fuel injector 8 and an oxidant injector 9 located at the periphery of the toroidal inner space 30. The combustion chamber 10 further comprises a turbine guide device 3 located upstream the combustion chamber exit to direct the hot gasses from the combustion chamber 10 into the blades of the turbine. Alternatively the turbine inlet guide device 3 could be situated downstream of the combustion chamber exit 15. The turbine inlet guide device 3 could be in the form of a vane or blade or any suitable means for directing air into the blades of the turbine.

The fuel and the oxidant are injected into the toroidal inner space 30 which establishes a vortex flow 2 in a central region of the toroidal inner space 30 that extends around a circular path around the rotor axis of the turbine. The angle of inclination and location of the fuel injector and oxidant injectors are such as to entrain hot gasses to maximize the vortex flow. The gas in the vortex flow comprises flue gas re-circulated inside the combustion chamber and around 10% residual oxygen. This is because combustion takes place at gas turbine conditions (i.e. lean stoichiometry $\lambda=2$ with residual oxygen around 10%).

The fuel is injected by the fuel injector 8 into region 11 which will typically be at 1650 K. The fuel penetrates the hot exhaust gas within the vortex 2 and is mixed with the re-circulated flue gas and simultaneously heated up to the autoignition threshold. At this point, as residual oxygen is available, the mixture ignites via an autoignition mechanism and highly combustion is initiated with its characteristic non-visible flame. The temperature of the process is controlled by the level of dilution of the mixture, and therefore the emission levels are limited.

Oxidant is injected into the combustion chamber 10 by the oxidant injector 9 downstream the fuel injector 8. The oxidant jet momentum will entrain hot gas while penetrating into the vortex 2 where part or all of the fuel is being burned or has burned.

Region 12 is located just downstream the oxidant injector, and at this point the hot gasses will comprise around 21% oxygen. The injection of oxidant provides the additional oxygen necessary to ensure complete burnout of the fuel and to re-establish the required residual oxygen concentration. Burnout will typically occur by the time the gasses reach region 13, at which point the gasses will comprise flue gas and around 10% residual oxygen. The majority of the re-circulated flue gas and residual oxygen will then flow around the vortex back to region 11. However, some gas flowing around the outer periphery of the radial section will converge towards the turbine inlet guide nozzle 3 and leave the combustion chamber 10 via exit 15. The gas leaving the combustion chamber will comprise around 10% oxygen and be at around 1650 K.

Both the fuel and oxidant injectors are inclined and positioned around the periphery of the toroidal combustion chamber 10 so as to optimize the flow field inside the combustion chamber 10. In order to entrain as much gas as possible in the vortex, the fuel and air are injected in a way to best mix with the vortex flow without generating flow disturbances. The angle formed between the direction of the jet entering the combustion chamber and the tangential flow of the vortex 2 at the corresponding location is from 0° to 90°. It has been found that the entrainment capacity of the injectors is further enhanced when the angle is from 15° to 60°.

The injectors are in the optimum location when intimate penetration and mixing of the fresh stream from the injectors with the hot gas vortex 2 occurs in such a way that the gas flows along at least one complete path around a radial section circumference of the inner space 30 before entering the turbine inlet guide device 3. This ensures that complete combustion takes place.

FIG. 7 shows an example of locations of the fuel and oxidant injectors. However, the fuel injector 8 could be positioned at any point around the circumference of the toroid on line 18 and the oxidant injector could be positioned at any point around the circumference of the toroid on line 19. Furthermore embodiments of the invention can employ a plurality of injectors located along lines 18 and 19.

In some embodiments the injection of the fuel and/or oxidant can be staged around a radial section circumference of the annular toroidal inner space 30 of the combustion chamber 10. This allows for gradual penetration and mixing of the fuel into the main vortex, which can lead to greater control over the ignition and combustion. By injecting the fuel in stages, an even temperature profile can be established all over the whole of combustion chamber 10. The oxidant can be injected in stages to control the temperature and ensure that complete burnout occurs, and staged oxidant injection can be used to prevent any risk of quenching.

Figure 8:
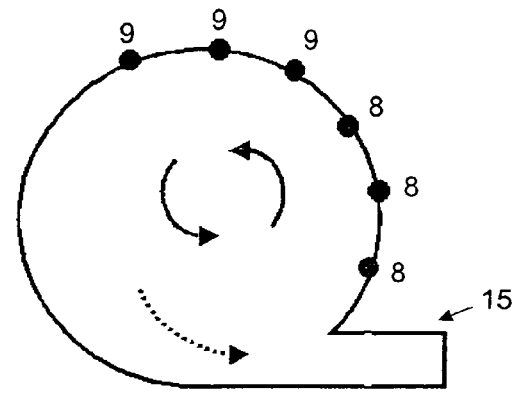
FIG. 8 is a schematic view of a radial section of a toroidal combustion chamber according to a second embodiment of the invention.
Figure 8:
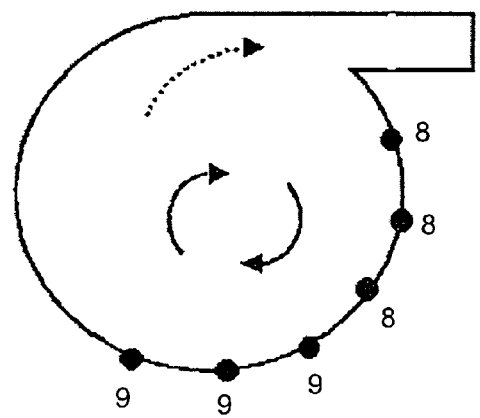

FIG. 8 shows an embodiment of the invention that uses a number of injectors to inject the fuel and oxidant in stages. In this embodiment the combustion chamber 10 comprises six fuel injectors 8 and six oxidant injectors 9. Three of the fuel injectors 8 are located in a row around a radial section circumference of the inner toroidal space 30, with an adjacent row of three oxidant injectors 9 located further along the radial section circumference and downstream the fuel injectors 8. The other three fuel injectors 8 and other three oxidant injectors 9 are located in a corresponding row located at points rotated 180° around the rotor axis 20 as shown in FIG. 8.

Figure 9:
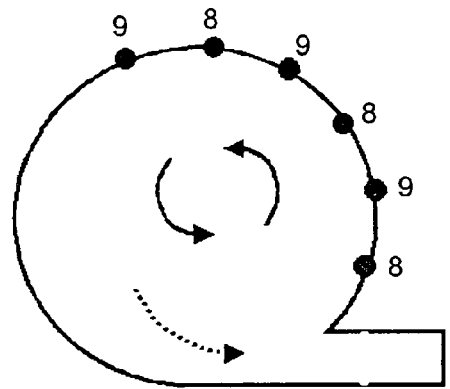
FIG. 9 is a schematic view of a radial section of a toroidal combustion chamber according to a third embodiment of the invention.
Figure 9:
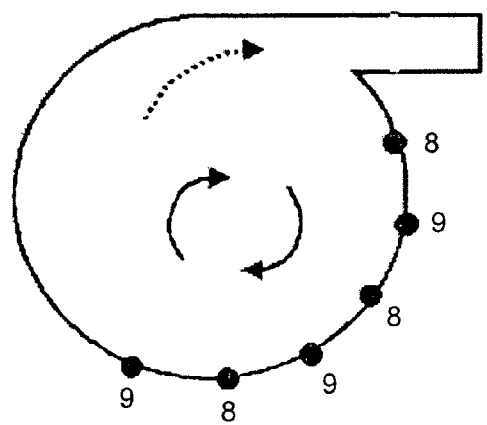

FIG. 9 shows an embodiment that employs six fuel injectors 8 and six oxidant injectors 9 in a different configuration. In this embodiment the fuel injectors 8 and oxidant injectors 9 are arranged in two groups, with three fuel and three oxidant injectors located in a row around a radial section circumference of the inner toroidal space 30, with each oxidant injector 9 located adjacent and downstream of each fuel injector 8. A corresponding row of adjacent fuel and oxidant injectors is located at points rotated 180° around the rotor axis 20. In terms of the overall combustion chamber configuration, each row extends from a radially inner position around a radial section circumference in a downstream direction.

During use, each injection of fuel is followed by the injection of oxidant. Combustion is therefore operated in a cascade mode, which allows for a large degree of control over combustion and burnout. This cascade mode establishes several small and separated autoignition and burnout zones, which has the effect of further suppressing pressure pulsations.

Alternatively, embodiments of the invention can employ other configurations of fuel 8 and oxidant injectors 9. The inclination of both the fuel 8 and oxidant 9 injectors can be varied, and the preferred arrangement is dictated by the optimum flow field considerations.

Diffusion burners are disclosed as being a requirement in the prior art applications of highly diluted combustion for atmospheric combustion applications (such as for furnaces). However, in combustion chambers of gas turbines the use of premix burners does not impede the establishment of highly diluted combustion, provided enough flue gas is re-circulated to allow autoignition of the mixture and sufficiently dilute the flame. Flue gas re-circulation rates of between 100% and 200% have been found to be sufficient. All the previously described embodiments have described diffusion burners with separate injection of the fuel and oxidant. This can lead to a greater amount of control over ignition and combustion, however, in other embodiments of the invention, the combustion chamber 10 can employ other types of burner such as premixed or partially premixed burners.

Figure 10:
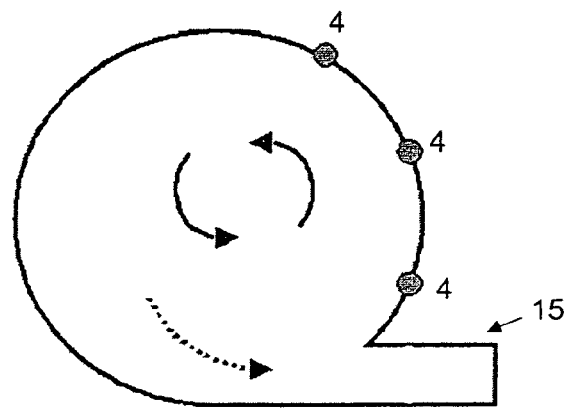
FIG. 10 is a schematic view of a radial section of a toroidal combustion chamber according to a fourth embodiment of the invention.
Figure 10:
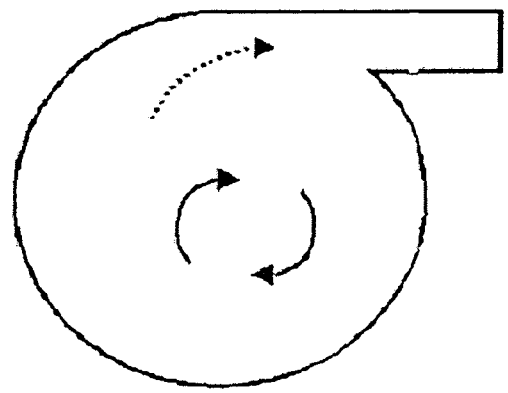

FIG. 10 is a schematic view of a radial section of a toroidal combustion chamber 10 according to a fourth embodiment of the invention. The combustion chamber 10 comprises three premix burners 4 located around a radial section circumference of the inner toroidal space 30. The premix burners are adapted to inject a premixed stream of fuel and oxidant into the combustion chamber 10. Alternatively, a different number or configuration of burners could be used.

In all the previously described embodiments, the injection of the fresh reactants at the periphery of the combustion chamber 10 and the vortex 2 flow field within the chamber 10 creates a layer of colder flow in the region of the walls of the combustion chamber 10. This can reduce this risk of the material comprising the walls of the combustion chamber 10 overheating. In order to further reduce the risk of the walls of the combustion chamber 10 overheating, embodiments of the invention can employ convective cooling, in which the oxidant from the compressor is directed through a region located adjacent the outside the toroidal inner space 30 before being injected into the combustion chamber plenum.

The injectors inject fluid with a velocity of from 80 to 100 m/s and have a nozzle diameter of from 10 to 50 mm.

Conventional lean premix burners for gas turbine systems typically exploit aerodynamically induced vortex breakdown, in which a stabilisation region is created and the flame anchored due to the equality between the gas convection velocity and the flame speed. In embodiments of the present invention burners are used in which the gas velocity always exceeds the flame speed, and a non-stabilized flame is established via an autoignition mechanism.

In the previously described embodiments, a non-swirled stabilized flame is used and no vortex breakdown occurs. No flame front is formed, as the combustion chamber 10 uses highly diluted combustion relying on intimate mixing of re-circulated flue gas with the fresh reactants and on autoignition of the resulting mixture. A non-stabilized flame develops, which is characterized by not having a flame front. Instead, the flame occupies a very diffuse volume, occupying the substantially the whole volume of the combustion chamber 10 with a homogeneous distribution of a plurality of discrete heat sources. This gives rise to a diverse combustion mode with a very high potential for self-induced pressure pulsation suppression. It allows also for very high power density to be reached. However, in such systems the residence time distribution takes an exponential form, and some gas particles may have long residence times in the reactor, which can be detrimental in terms of NOx emission production. This can be mitigated by the lower NOx dependence on temperature in highly diluted conditions as shown by FIG. 11.

Figure 11:
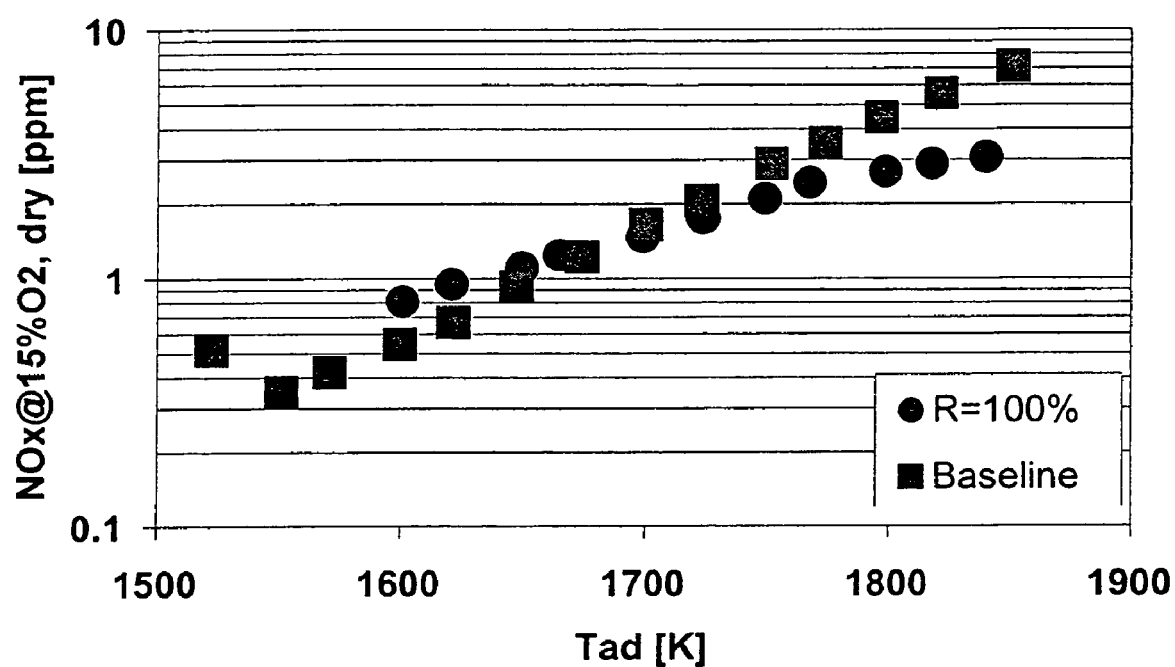
FIG. 11 is a graph of NOx levels against temperature for both a highly diluted flame with a re-circulation rate of 100%, and a lean premix flame.

FIG. 11 shows a comparison of experimental results concerning a highly diluted flame with a re-circulation rate of 100% and a standard, non-diluted flame with a re-circulation rate of zero. The experiments were carried out with natural gas as a fuel, and with an inlet temperature of 600° C. FIG. 11 shows that the amount of NOx produced by the highly diluted flame is less sensitive to flame temperature than the baseline flame.

Experiments have shown that using a higher inlet temperature than 600° C. will produce an increase in the reduction of NOx associated with the highly diluted flame. It also has the effect of enlarging the temperature operating range at which the highly diluted combustion has better NOx potential than the baseline flame.

In conventional lean premix burners for gas turbine systems, small re-circulation zones form at the exit of each burner. These are localised heat sources and are not stable and can lead to pressure fluctuations with the combustion chamber termed pulsations. However, in embodiments of the present invention there is an overall re-circulation zone for all the burners. This greatly reduces the tendency for pressure fluctuation as the flame is spread over substantially the whole of the combustion chamber 10.

However, pulsations can still occur, particularly if one of the burners develops a fault and runs less efficiently than the others. In order to overcome this problem, embodiments of the invention use pulsating jets to help control pressure pulsations. The use of out-of-phase pulsating jets for the injection of the fuel and oxidant can be used to suppress these pulsations if they develop. Furthermore, the use of pulsating jets can also lead to a greater control over the process and enhance entrainment and mixing.

The embodiments thus far described are characterised by non-swirling flow of fuel and oxidant from their respective injectors. However, embodiments of the invention can employ a swirling component, which is known to enhance mixing. However, too strong a swirling component will prevent the combustion chamber 10 operating in a flameless combustion mode. This is because a strong swirling component can generate a swirl-stabilised flame, which could give rise to a conventional flame front mode with elevated flashback risk and self-induced pulsations.

However, highly diluted combustion can be used with a weak swirling component. Weak swirl is known to generate some rotational flow, without the occurrence of any vortex breakdown that characterises conventional lean premixed, swirl-stabilised flames. The threshold between weak (no vortex breakdown) and strong (vortex breakdown) swirl is known to be S=0.6.

Embodiments of the invention can use swirl components with S less than 0.6. However, a swirl component of less that 0.4 is preferred to avoid any risk of vortex breakdown, and therefore avoid the risk of flashback.

As a back-up mode, embodiments of the present invention can additionally comprise moving parts adapted to establish a strong (S>0.6) swirling flow.

Combustion chambers according to embodiments of the invention solve many of the problems associated with combustion chambers operating under lean premix combustion. Flashback is not an issue, as flame stabilization is operated via an autoignition mechanism.

In addition, combustion chambers according to embodiments of the invention offer several advantages over conventionally shaped combustion chambers when used for highly diluted combustion. In particular, combustion chambers according to embodiments of the present invention allow for higher levels of flue gas to be re-circulated inside the combustion chamber.

In conventionally shaped chambers, flue gas re-circulation inside the chamber relies on the momentum of single free jets. However, as gas turbines typically operate with very high air to fuel ratios (i.e. very lean mixtures) and severe space constraints, a conventionally shaped gas turbine cannot use a burner based on single free jets. It is therefore unavoidable that each jet will interfere with the adjacent jets and the nominal entrapment capability of each single jet will be depleted.

Alternatively, conventionally shaped combustion chambers can use flue gas re-circulated outside the combustion chamber. However, such a configuration can result in undesirably high pressure loses which result in a lower process efficiency. Therefore on the basis of the above it can be difficult to provide a high levels flue gas re-circulation in conventionally shaped gas turbines.

However, in embodiments of the present invention, a vortex is set up inside the combustion chamber by virtue of the an annular toroidal inner space. Furthermore, the burners are positioned and inclined relative to the vortex in order to maximise the entrapment of hot gasses within this vortex. This enhanced vortex provides high enough levels of flue gas re-circulated inside the combustion chamber to allow the onset of highly diluted combustion without the need for flue gas re-circulation outside the combustion chamber. However, if desired embodiments of the invention could re-circulate flue gas outside the combustion chamber. This flue gas re-circulated outside the combustion chamber could be premixed with the oxidant or fuel before being injected into the combustion chamber.

In addition, the compact toroidal design allows for extremely short rotor lengths, and does not impact on engine spatial constraints. The flame is both compact and well distributed all over the entirety of the volume of the combustion chamber, which allows the toroidal combustion chamber to be more compact than conventionally shaped combustion chambers when used for highly diluted combustion. Furthermore it is possible to retrofit embodiments of the invention into an existing gas turbine systems.

The toroidal shape of combustion chambers operating in a highly diluted mode according to the embodiments of the invention leads to very flexible systems for dual or multi-fuel purposes as well as for engine operation issues.

As a result of the above, embodiments of the invention are very robust and reliable, as well as being compact. This leads to increased combustion chamber lifetime and lower costs.

All previously described embodiments of the invention employ a toroid with closed curve that is substantially annular, with a tangential projection. However, embodiments of the invention could employ toroids with closed curves that have different curvatures. Furthermore, in all described embodiments the burners have been described as located at the periphery of the annular toroidal inner space of the combustion chamber. However, the burners could extend into the inner space.

Many further variations and modifications will suggest themselves to those versed in the art upon making reference to the foregoing illustrative embodiments, which are given by way of example only, and which are not intended to limit the scope of the invention, that being determined by the appended claims

The invention claimed is:

1. A combustion chamber for a gas turbine, the combustion chamber comprising:
a substantially toroidal plenum extending around a rotor axis of the gas turbine, the plenum comprising a substantially tangential outlet that extends around a radially inner peripheral region of the plenum, wherein the tangential outlet is adapted to direct gases towards the turbine in a direction that is substantially parallel to the rotor axis of the turbine; and at least one combustion fluid injector disposed in a peripheral region of the plenum, the at least one combustion fluid injector being adapted to inject fluid into the plenum to establish a vortex flow in a central region of the plenum that extends around the rotor axis of the gas turbine in a circular path;
wherein the at least one combustion fluid injector is adapted to entrain sufficient gasses in the vortex to establish a high enough flue gas re-circulation rate to enable the generation of a highly diluted combustion mode in the plenum during combustion; and
wherein the combustion chamber comprises at least two combustion fluid injectors, wherein the at least two combustion fluid injectors comprise at least one oxidant injector and at least one fuel injector, the combustion chamber being adapted to operate with separate oxidant and fuel injection.

2. A combustion chamber according to claim 1, wherein an angle formed between a direction of fluid injection from the at least one combustion fluid injector and a tangential direction at a point where the fluid meets the vortex is from 0° to 90°.

3. A combustion chamber according to claim 2, wherein the angle is from 150° to 60°.

4. A combustion chamber according to claim 1, wherein the fuel is injected upstream of the oxidant injection.

5. A combustion chamber according to claim 1, wherein the at least one combustion fluid injector has a swirl coefficient of less than 0.6.

6. A combustion chamber according to claim 5, wherein the at least one combustion fluid injector has a swirl coefficient of less than 0.4.

7. A combustion chamber according to claim 1, further comprising:
a plurality of out of phase pulsating jets adapted to inject the air and fuel into the combustion chamber.

8. A combustion chamber according claim 1, wherein the substantially tangential outlet is adapted to extend around an entire radially inner peripheral region of the plenum to define a circular outlet.

9. A combustion chamber according to claim 1, wherein the substantially tangential outlet comprises a nozzle.

10. A combustion chamber according to claim 1, further comprising:
   a guide device located either upstream or downstream of the substantially tangential outlet, the guide device being adapted to direct gasses into the blades of the turbine.

11. A combustion chamber according to claim 10, wherein the guide device comprise a vane or a blade.

* * * * *